United States Patent
Amann et al.

(10) Patent No.: US 8,720,416 B2
(45) Date of Patent: May 13, 2014

(54) METHODS AND APPARATUS TO DETECT AND INHIBIT LOW-SPEED PRE-IGNITION IN AN ENGINE

(75) Inventors: Manfred Amann, San Antonio, TX (US); Terrence F. Alger, II, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 610 days.

(21) Appl. No.: 13/013,502

(22) Filed: Jan. 25, 2011

(65) Prior Publication Data

US 2012/0186225 A1 Jul. 26, 2012

(51) Int. Cl.
*F02P 5/00* (2006.01)

(52) U.S. Cl.
USPC ............. 123/406.44; 123/406.47; 123/406.52

(58) Field of Classification Search
USPC ............. 123/406.11, 406.23, 406.44, 406.45, 123/406.47, 406.52
See application file for complete search history.

(56) References Cited

U.S. PATENT DOCUMENTS

| | | | |
|---|---|---|---|
| 5,738,074 A * | 4/1998 | Nakamura et al. | 123/305 |
| 5,778,857 A * | 7/1998 | Nakamura et al. | 123/406.37 |
| 8,260,530 B2 * | 9/2012 | Rollinger et al. | 701/111 |
| 2004/0099237 A1* | 5/2004 | Katayama | 123/192.1 |
| 2005/0056254 A1 | 3/2005 | Wozniak et al. | |
| 2007/0044753 A1* | 3/2007 | Brehob | 123/304 |
| 2007/0215107 A1 | 9/2007 | Shelby et al. | |
| 2007/0215111 A1* | 9/2007 | Surnilla | 123/431 |
| 2009/0043478 A1 | 2/2009 | Labonte | |
| 2009/0101111 A1* | 4/2009 | Brehob | 123/406.59 |

* cited by examiner

*Primary Examiner* — John Kwon
(74) *Attorney, Agent, or Firm* — Grossman Tucker et al

(57) ABSTRACT

The disclosure provides a method of detecting and inhibiting an abnormal combustion event in an internal combustion engine, comprising operating the internal combustion engine to produce exhaust gas from the cylinder at a break mean effective pressure greater than or equal to 10 bars at a speed less than or equal to 2,000 revolutions per minute; monitoring the exhaust gas from the cylinder with an oxygen sensor while the internal combustion engine undergoes a pre-ignition combustion event; obtaining an output from the oxygen sensor, the output from the oxygen sensor providing an indicator of the pre-ignition combustion event; and adjusting at least one operating parameter of the internal combustion engine in response to the output of the oxygen sensor, wherein the at least one operating parameter is adjusted to inhibit an occurrence of a subsequent pre-ignition combustion event.

15 Claims, 3 Drawing Sheets

FIG. 2

| | 1 | 2 | 3 | 4 | 5 | 6 | 7 |
|---|---|---|---|---|---|---|---|
| Peak Cylinder BMEP | | | | | | | |
| Pressure @ Peak (bar) | 115 | 129 | 132 | 165 | 175 | 110 | 110 |
| Crankangle @ Peak (deg.) | 2520 | 3960 | 5400 | 6120 | 8280 | 9720 | 10440 |
| | | | | | | | |
| Peak Equivalence Ratio (Φ) | A | B | C | D | E | F | G |
| Φ @ Peak | 1.22 | 1.19 | 1.12 | 1.24 | 1.16 | 1.09 | 1.09 |
| Crankangle @ Peak (deg.) | 3390 | 4780 | 6120 | 6940 | 9100 | 10280 | 11000 |
| | | | | | | | |
| Net Crank Position Change From Peak BMEP To Peak Φ (degrees) | 870 | 820 | 720 | 820 | 820 | 560 | 560 |
| Net Crank Position Change From Peak Cylinder Pressure To Peak Φ (rotations) | 2.42 | 2.28 | 2 | 2.28 | 2.28 | 1.56 | 1.56 |
| | | | | | | | |
| Rate Of Φ Change | A-A | B-B | C-C | D-D | E-E | F-F | G-G |
| Increase in Φ/sec. | 4.58 | | | | | | |
| Increase in Φ/crank rotation (360 degrees) | 0.0006 | | | | | | |

METHODS AND APPARATUS TO DETECT AND INHIBIT LOW-SPEED PRE-IGNITION IN AN ENGINE

FIELD OF THE INVENTION

The present disclosure relates to spark initiated internal combustion engines, and more particularly, to methods and apparatus to detect and inhibit low-speed pre-ignition combustion events therein.

BACKGROUND

Internal combustion engines, such as gasoline engines, commonly employ a four-stroke working cycle. The four strokes may be referred to as the intake, compression, combustion (power), and exhaust strokes, which occur during two crankshaft rotations per working cycle of the engine. The working cycle may be understood to begin with the intake stroke with a piston at Top Dead Center (TDC) position, when the piston is closest to the cylinder head and farthest away from the axis of the crankshaft. A stroke may be understood to refer to a full travel of the piston from Top Dead Center (TDC) position to Bottom Dead Center (BDC) position, when the piston is furthest from the cylinder head and closest to the axis of the crankshaft.

During the intake stroke, the piston may be understood to descend from the top of a cylinder (i.e. TDC) to the bottom of the cylinder (i.e. BDC), reducing the pressure inside the cylinder. During the travel of the piston, an intake valve of the cylinder may open and a mixture of air and fuel may be introduced into the combustion chamber of the cylinder, under atmospheric or greater pressure, through an intake port. The intake valve may then close.

Thereafter, during the compression stroke, the piston may then return to the top of the cylinder, compressing the air-fuel mixture in the combustion chamber. Once the piston returns to TDC, the crankshaft will have undergone the first rotation of the working cycle.

Next, the power stroke may be understood to begin when the piston is at TDC. After igniting the compressed air-fuel mixture with an igniter, such as a spark plug, the resulting pressure from the combustion of the compressed air-fuel mixture may then force the piston back down towards BDC. This stroke is the main source of the engine's torque and power.

The compressed air-fuel mixture within the combustion chamber may be ignited by the igniter near the end of the compression stroke. Igniting the air-fuel mixture before the piston reaches TDC may allow the resulting flame to better propagate and the mixture to more fully burn soon after the piston reaches TDC.

However, if the ignition spark occurs at a position that is too advanced relative to piston position, the rapidly expanding air-fuel mixture may push against the piston as it is moving up during the compression stroke, causing possible engine damage. If the spark occurs too retarded relative to the piston position, maximum cylinder pressure may occur during the combustion stroke after the piston has traveled too far down the cylinder. This often results in lost power, high emissions, and unburned fuel.

After the combustion stroke, during the exhaust stroke, the piston once again returns to TDC while an exhaust valve of the cylinder may be opened. This action may evacuate the products of combustion from the combustion chamber of the cylinder by pushing combustion products through an exhaust port. The exhaust valve may then close. Once the piston returns to TDC, the crank shaft will have undergone the second rotation of the working cycle and the engine will thereafter repeat the cycle.

In certain situations, the internal combustion engine may exhibit abnormal combustion. Abnormal combustion in a spark-initiated internal combustion engine may be understood as an uncontrolled explosion occurring in the combustion chamber as a result of ignition of combustible elements therein by a source other than the igniter.

Two types of abnormal combustion may include detonation and pre-ignition. Detonation may be understood as the spontaneous combustion of end-gas (remaining fuel-air mixture) in the combustion chamber occurring after normal combustion is initiated by the igniter. Without being bound to a particular theory, unburned end-gas, under increasing heat and pressure (from the normal progressive burning process and combustion) spontaneously combusts, ignited solely by the intense heat and pressure. The remaining fuel in the end-gas may lack sufficient octane rating to withstand the combination of heat and pressure without igniting. As a result, multiple flame fronts within the combustion chamber may form instead of a single flame kernel. Thus, detonation may be characterized by an instantaneous, explosive ignition of at least one pocket of fuel/air mixture outside of the normal flame front.

If these multiple flames collide, they may do so with such force that produces a sudden rise in cylinder pressure. From a pressure trace of the combustion chamber, the normal burn would be accompanied by a normal pressure rise, followed by a sudden increase (spike) when the detonation occurs after the igniter spark. The spike in pressure may create a force in the combustion chamber which may cause the structure of the engine to ring, or resonate, much as if it were hit by a hammer, with a sharp metallic pinging/knocking noise. Resonance which is characteristic of combustion detonation may occur at about 3 to 6 kilohertz. Thus, the pinging/knocking heard may be understood to be ringing of the engine structure in response to the pressure spikes. The hammer-like shock waves created by detonation may subject various components of the engine (e.g. cylinder head, head gasket, pistons and rings) to damage.

More particularly, a rapid rise in cylinder pressure may occur due to a very rapid combustion speed (close to instantaneous) for knocking combustion. High speed pressure waves may be created that "bounce" between combustion chamber walls at high frequencies. Due to their fast speed and the high temperatures present in the combustion chamber, heat transfer rates into components such as piston may increases dramatically to where melting of piston crown material can occur, usually around edges of piston top land.

To inhibit engine knock particularly associated with detonation, an internal combustion engine may be equipped with one or more knock sensors. The knock sensor generally may include a piezoelectric element, which generates a voltage when a vibration is applied thereto. The piezoelectric element may be tuned to the frequency of engine knock and, when the piezoelectric element is exposed to this frequency, a voltage may be generated which provides a signal to an engine controller. The greater the magnitude of the frequency, the greater the voltage generally generated by the piezoelectric element. The voltage signal may then be used by the engine controller to adjust ignition spark and/or fuel injection timing until the detonation stops.

Unfortunately, in order to best detect vibrations associated with engine knock, the engine's knock sensor must generally be in close proximity to the cylinder, and multiple knock sensors may be required depending upon the number of cylinders and the engine's size. Consequently, replacement of the knock sensor(s) may be difficult and costly depending on how difficult the sensor is to replace.

Pre-ignition may be understood as an abnormal form of combustion resulting from ignition of the air-fuel mixture prior to ignition by the igniter. Anytime the air-fuel mixture in the combustion chamber is ignited prior to ignition by the igniter, such may be understood as pre-ignition.

Without being bound to a particular theory, historically pre-ignition has occurred during high speed operation of an engine when a particular point within the combustion chamber of a cylinder may become hot enough during high speed operation of the engine to effectively function as a glow plug (e.g. overheated spark plug tip, overheated burr of metal) to provide a source of ignition which causes the air-fuel mixture to ignite before ignition by the igniter. Such pre-ignition may be more commonly referred to as hot-spot pre-ignition, and may be inhibited by simply locating the hot spot and eliminating it.

More recently, vehicle manufacturers appear to have observed intermittent abnormal combustion in their production of turbocharged gasoline engines, particularly at low speeds and medium-to-high loads. More particularly, when operating the engine at speeds less than or equal to 2,000 rpm and under a load with a break mean effective pressure (BMEP) of greater than or equal to 10 bars, a condition which may be referred to as low-speed pre-ignition (LSPI) may occur in a very random and stochastic fashion. Without being bound to a particular theory, LSPI is not understood to occur at a particular location within an engine which functions as a hot-spot for pre-ignition as with hot-spot pre-ignition, and thus has proven more difficult to eliminate.

What is needed is a method and apparatus to detect and inhibit, either by reducing or preventing, the occurrence of LSPI combustion event(s) in an internal combustion engine before damage to the engine may occur.

SUMMARY

From low-speed pre-ignition (LPSI) experiments, it has been found that a sharp increase in hydrocarbon emissions, as shown by a rich exhaust air-fuel ratio spike, may closely follow LSPI engine cycles. By utilizing an oxygen (concentration) sensor, such as a wideband sensor, located upstream of the exhaust pipe (pre-catalyst/catalytic converter), particularly closely coupled to the exhaust port, the occurrence of LSPI may be detected on an engine cycle-by-cycle basis. Using this method, a LSPI event can be detected after the first LSPI engine cycle, and subsequent LSPI engine cycles can be inhibited by engine controls strategies that may include, but are not limited to, a modification of the fuel injection strategy such as adjusting the fuel injection amount, timing or profile; temporary reduction of the engine load by at least partially closing the throttle; at least partially reducing boost pressures of the turbo; and/or a modification of combustion timing strategies such as adjusting the igniter (spark) timing.

According to one aspect of the invention, the invention may provide a method to detect and inhibit an abnormal combustion event in an internal combustion engine, wherein the method comprises introducing air and fuel into a cylinder of the internal combustion engine; operating the internal combustion engine to produce exhaust gas from the cylinder, the engine operated at a break mean effective pressure greater than or equal to 10 bars at a speed less than or equal to 2,000 revolutions per minute; monitoring the exhaust gas from the cylinder with an oxygen sensor while the internal combustion engine undergoes a pre-ignition combustion event, wherein the air-fuel mixture in the cylinder ignites prior to an introduction of a spark to the cylinder from an igniter; obtaining an output from the oxygen sensor, the output from the oxygen sensor providing an indicator of the pre-ignition combustion event; and adjusting at least one operating parameter of the internal combustion engine in response to the output of the oxygen sensor, wherein the at least one operating parameter is adjusted to inhibit an occurrence of a subsequent pre-ignition combustion event.

In certain embodiments of the invention, adjusting at least one operating parameter for the internal combustion engine in response to the output of the oxygen sensor may be performed by an electronic programmable engine controller. The engine controller may adjust at least one of a fuel injection amount, fuel injection timing and fuel injection profile of the cylinder. The engine controller may also adjust a combustion (spark) timing of the cylinder. In other embodiments, the internal combustion engine may include a throttle, and the engine controller may at least partially close the throttle. In still other embodiments, the internal combustion engine may include a turbo, and the engine controller may at least partially reduce a boost pressure of the turbo.

In certain embodiments of the invention, the output from the oxygen sensor may provide an indicator of the pre-ignition combustion event within two revolutions of the engine after the occurrence of the pre-ignition combustion event.

In certain embodiments of the invention, the output from the oxygen sensor may correspond to an air-fuel equivalence ratio, Phi ($\Phi$), following the pre-ignition combustion event, and an engine controller may use the output to adjust at least one operating parameter of the internal combustion engine in response to the output of the oxygen sensor to inhibit an occurrence of a subsequent pre-ignition combustion event. The engine controller may be programmed such that, once a predetermined (programmed) threshold air-fuel equivalence ratio is exceeded, the engine controller may use the output to adjust at least one operating parameter of the internal combustion engine in response to the output of the oxygen sensor to inhibit an occurrence of a subsequent pre-ignition combustion event.

In certain embodiments of the invention, the output from the oxygen sensor may comprise a voltage signal, which may be received by an engine controller. The oxygen sensor may comprise a wideband oxygen sensor and/or a dual cell oxygen sensor.

In certain embodiments of the invention, the internal combustion engine may comprise a plurality of cylinders; and the oxygen sensor may sense exhaust gas from a cylinder prior to the exhaust gas mixing with exhaust gas from the other cylinders.

In certain embodiments, the internal combustion engine may comprise a plurality of cylinders and oxygen sensors, with at least one oxygen sensor configured to operate with each cylinder of the engine. Each oxygen sensor may sense exhaust gas from the cylinder the sensor is configured to operate with prior to the exhaust gas from each cylinder mixing with exhaust gas from the other cylinders.

In another embodiment of the invention, an apparatus to detect and inhibit an abnormal combustion event in an internal combustion engine, wherein the apparatus comprises an exhaust manifold, the exhaust manifold comprising a plurality of branch exhaust passages, each branch exhaust passage configured to separately receive exhaust gas from a different combustion chamber of the internal combustion engine, and at least one oxygen sensor located in each branch exhaust passage of the exhaust manifold.

In certain embodiments, the apparatus may further comprise an engine controller, the engine controller configured to detect a presence of a pre-ignition event in response feedback received from the at least one oxygen sensor while the engine is operated at a break mean effective pressure greater than or equal to 10 bars at a speed less than or equal to 2,000 revolutions per minute, and adjust at least one engine operating parameter of an internal combustion engine in response to the pre-ignition combustion event to inhibit an occurrence of a subsequent pre-ignition combustion event.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIG. 2 provides a tabular representation of certain data from FIG. 1.

DETAILED DESCRIPTION

Figure 1:
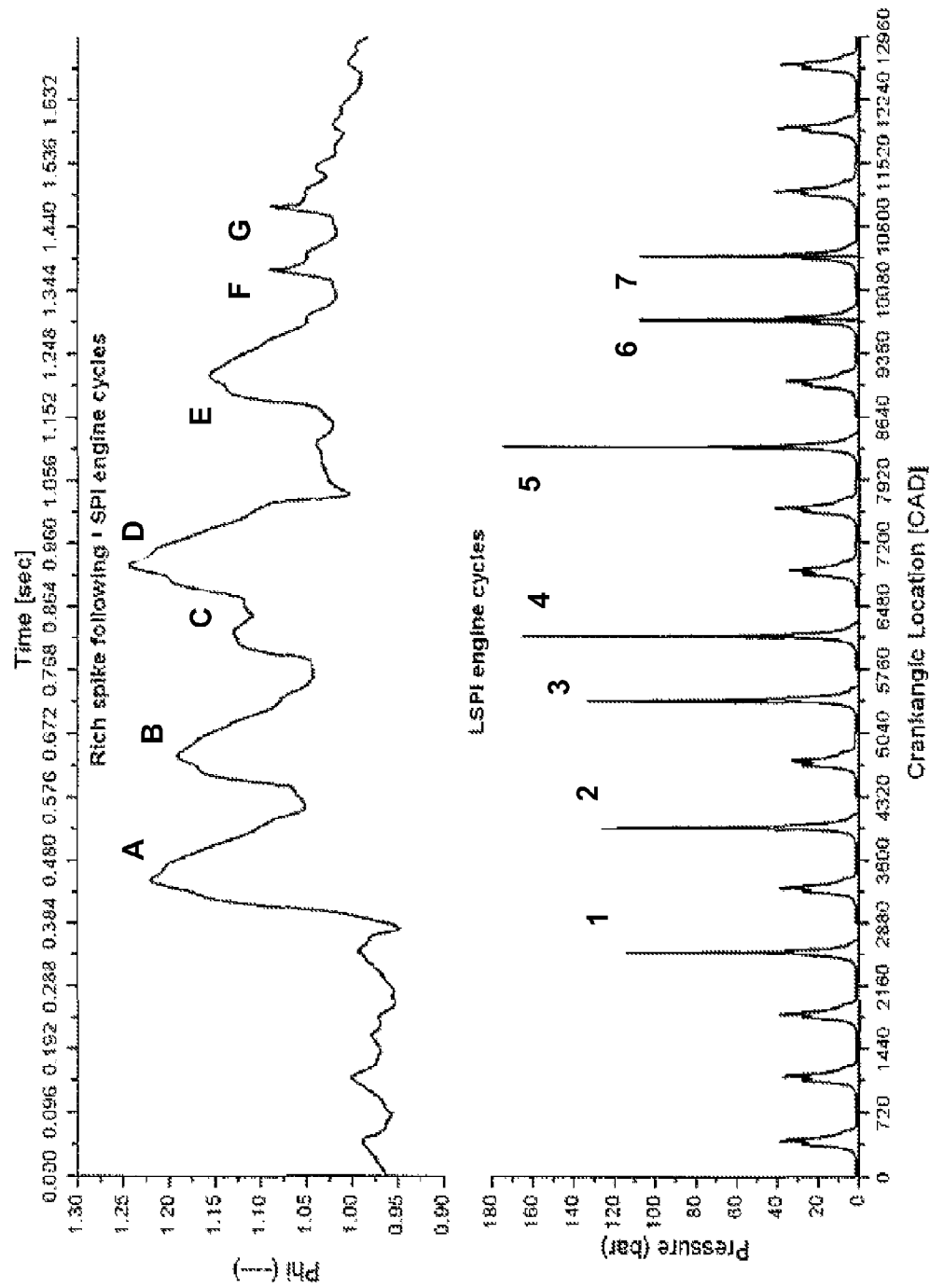
FIG. 1 provides a graph showing increases in air-fuel mixture equivalence ratio, Phi ($\Phi$), following LSPI engine cycles of an event as indicated from an increase in in-cylinder pressure of a cylinder of an internal combustion engine.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the Applicant is entitled to claim, or the only manner(s) in which the invention(s) may be claimed, or that all recited features are necessary.

As indicated above, when operating the engine at speeds less than or equal to 2,000 rpm and under a load with a break mean effective pressure (BMEP) of greater than or equal to 10 bars, a low-speed pre-ignition (LSPI) event may occur in the engine. A LSPI event may consist of one or more LSPI combustion cycles, and generally consists of multiple LSPI combustion cycles which occur in a consecutive fashion or alternating fashion with normal combustion cycles in between. Without being bound to a particular theory, LSPI may result from a combustion of oil droplet(s), or a droplet(s) of oil-fuel mixture, or combinations thereof, which may accumulate, for example, in the top land crevices volume of a piston, or the piston ring-land and ring-groove crevices. The lubricant oil may be transferred from below the oil control ring to the piston top land area due to unusual piston ring movements. At low speed, high load conditions, in-cylinder pressures dynamics (compression and firing pressures) may be considerably different from in-cylinder pressures at lower loads, particularly due to strongly retarded combustion phasing and high boost and peak compression pressures which can influence ring motion dynamics.

At the foregoing loads, LSPI, which may be accompanied by subsequent detonation and/or severe engine knock, can cause severe damage to the engine very quickly (often within 1 to 5 engine cycles). Engine knock may occur with LSPI given that, after the normal spark from the igniter is provided, multiple flames may be present. The present invention aims to provide a method and apparatus to detect and inhibit, either by reducing or preventing, the occurrence of LSPI events, in an internal combustion engine before damage to the engine may occur.

For an internal combustion engine, it is often desirable to introduce the air and combustion fuel into the combustion chamber of the engine at a particular ratio. When gasoline is used as a fuel, the stoichiometric air-fuel mixture is generally understood to be approximately 14.7 to 1 or, stated another way, 14.7:1. In other words, with a stoichiometric air-fuel mixture of 14.7 to 1, the air and fuel are balanced such that exactly enough air is provided to completely burn all of the fuel.

If there is less air than required to maintain the stoichiometric air-fuel mixture, then there will be excess fuel left over after combustion, which may be referred to as a rich mixture. If there is more air than required to maintain the stoichiometric air-fuel mixture, then there will be excess oxygen left over after combustion, which may be referred to as a lean mixture.

Both a rich mixture and a lean mixture can present certain problems. Rich mixtures may produce cooler combustion gas than a stoichiometric mixture, however may have poorer fuel efficiency and an increase in pollution in the form of unburned hydrocarbons and carbon monoxide (CO) which may not be treated by the catalytic converter. Lean mixtures may produce less power than the stoichiometric mixture, and pollution in the form of nitrogen oxides (Nox). Thus, it is often desirable to operate an internal combustion engine close to the stoichiometric air-fuel mixture.

The air-fuel ratio (AFR) may be defined as the mass ratio of air to fuel present during combustion, which can be represented as follows:

$AFR = mass_{(air)}/mass_{(fuel)}$

In order to simplify use of the air-fuel ratio, it is often desirable to relate the actual AFR to the stoichiometric AFR as follows:

$Lambda(\lambda) = AFR_{(actual)}/(AFR_{(stoich.)})$

From the foregoing equation, a lambda ($\lambda$) of 1.0 is at stoichiometry, rich mixtures are less than 1.0, and lean mixtures are greater than 1.0.

Finally, the ratio of fuel-to-air ratio to the stoichiometric fuel-to-air ratio may be provided as follows:

$$\text{Equivalence Ratio, Phi}(\Phi) = (\text{fuel/air ratio}_{(actual)})/(\text{fuel/air ratio}_{(stoich.)}) = (m(\text{fuel})/m(\text{air}))(\text{actual})/(m(\text{fuel})/m(\text{air}))(\text{stoich.}) = 1/\text{Lambda or } 1/\lambda$$

Thus, an equivalence ratio, Phi ($\Phi$), of 1.0 is at stoichiometry, rich mixtures are greater than 1.0, and lean mixtures are less than 1.0.

With the foregoing in mind, and referring to FIG. 1, there is shown a graph depicting the operational cycle of a turbo charged internal combustion engine operated at a speed of approximately 1,250 crankshaft revolutions per minute (rpm). The upper portion of the graph plots equivalence ratio, Phi ($\Phi$), on the y-axis, while the lower portion of the graph plots in-cylinder pressure on the y-axis, in bars. Both the equivalence ratio, Phi ($\Phi$), and corresponding in-cylinder pressure are plotted versus time, in seconds (sec) along the top of the graph, or crankangle location, in degrees along the bottom of the graph. Certain data from FIG. 1 is reproduced in tabular form in FIG. 2.

As can be seen from FIG. 1, under normal combustion conditions, the peak in-cylinder pressure of a cylinder of the engine is approximately 40 bar and the air-fuel equivalence ratio, Phi ($\Phi$), ranges from about 0.95 to 1. However, as also may be seen from FIG. 1, seven LSPI engine cycles of a LSPI event, identified at Points 1-7, were observed during operation of the internal combustion engine. As shown, during these LSPI engine cycles, the in-cylinder pressure of the cylinder of the internal combustion engine increased from about 40 bar to a range of about 110 bar, (at Points 6 and 7) to about 175 bar (at Point 5). Thus, the cylinder pressure increased from about 2.8 times to 4.4 times. As shown, the LSPI engine cycles were random in fashion, with consecutive Points 3 to 4, and Points 6 to 7 separated by a one working cycle of the engine (i.e. 720 degrees); consecutive Points 1 to 2, Points 2 to 3, and Points 5 to 6 separated by two working cycles of the engine (i.e. 1440 degrees); and consecutive points 4 to 5 separated by three working cycles of the engine (i.e. 2160 degrees).

As also may be seen from the upper plot of FIG. 1, the occurrence of each LSPI engine cycle at Points 1-7 was followed by an increase in the equivalence ratio, Phi ($\Phi$), as identified by peaks at Points A-G, respectively. Thus, the increase in the equivalence ratio, Phi ($\Phi$), at Points A-G may be understood to provide a lagging indicator of the occurrence of the LSPI combustion engine cycle. The delay, or lag, in the measured increase in the equivalence ratio, Phi ($\Phi$), may be attributable to transport delay of the exhaust from the cylinder, as well as reading delay of the sensor measuring the equivalence ratio, Phi ($\Phi$), as more fully explained below.

As can be seen, after displaying a normal high of about 1 prior to the occurrence of the LSPI combustion engine cycles, the equivalence ratio, Phi ($\Phi$), increased to a high ranging from 1.09 (at Points F and G) to 1.24 (at Point D) after the occurrence of the LSPI combustion engine cycles. As explained above, the presence of an equivalence ratio, Phi ($\Phi$), greater than 1.0 signifies a rich air-fuel mixture having combustible products therein, particularly hydrocarbons.

Without being bound to a particular theory, LSPI may result from a combustion of oil droplet(s), or a droplet(s) of oil-fuel mixture, or combinations thereof, which may accumulate, for example, in the top land crevices volume of a piston, or the piston ring-land and ring-groove crevices. The lubricant oil may be transferred from below the oil control ring to the piston top land area due to unusual piston ring movements. At low speed, high load conditions, in-cylinder pressures dynamics (compression and firing pressures) may be considerably different from in-cylinder pressures at lower loads, particularly due to strongly retarded combustion phasing and high boost and peak compression pressures which can influence ring motion dynamics. As a result, it may be possible for one or more heated droplets of lubricant oil and/or oil-fuel mixture to ignite to cause the surrounding air-fuel mixture to ignite, in which case engine knock may be present with the LSPI particularly if multiple flame fronts ignite during the stroke.

As also explained above, the occurrence of a LSPI engine cycle in an internal combustion engine does not necessarily result in a resonance through the internal combustion engine which may be detected by a knock sensor. While LSPI cycles may result in a very strong "pinging" or "hammering" noise emitted by the engine due to the very high pressure rise rates and peak pressures, the frequencies of this noise may be different than typical knock frequencies. Therefore, a knock sensor may not be designed and tuned to accurately detect LSPI related noise.

Figure 3:
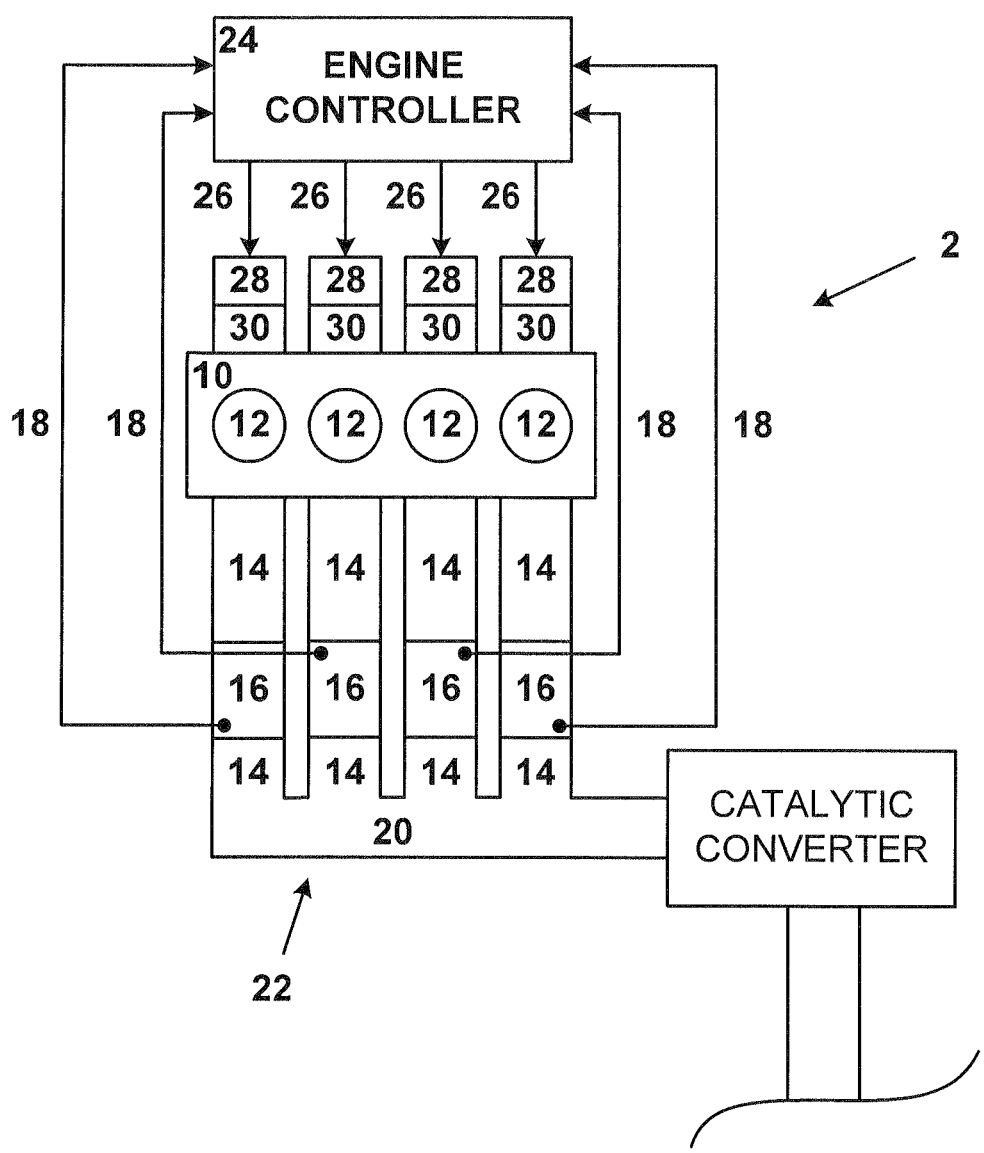
FIG. 3 provides a block diagram of an apparatus to detect and inhibit a LSPI combustion event in an internal combustion engine according to the present invention.

Consequently, as shown in FIG. 3 the present invention makes use of an oxygen (concentration) sensor 16 to provide an indicator of the LSPI combustion engine cycle/event. The sensor 16 may be particularly placed in an exhaust stream/passage 14 between the combustion chamber/cylinder 12 in cylinder block 10 of the internal combustion engine 2 and a downstream catalytic converter 22.

More particularly, the oxygen sensor 16 may comprise an electronic device which measures the proportion of oxygen in the exhaust gas. The oxygen sensor 16 may not directly measure oxygen concentration, but rather the amount of oxygen needed to completely oxidize any remaining combustibles (e.g. hydrocarbons) in exhaust gas. The oxygen sensor 16 may comprise a solid-state electrolyte, particularly made of zirconia ceramic (zirconium oxide, and more particularly zirconium dioxide). The zirconia ceramic may be coated with a layer of porous, gas permeable platinum on two opposing sides, with one layer of the platinum adjacent the exhaust gas and the other layer adjacent external (reference or atmospheric) air.

Furthermore, the sensor 16 may operate as a solid-state electrochemical cell such as a Nernst (galvanic) cell. With this construction, two electrodes may provide an output voltage corresponding to the quantity of oxygen in the exhaust relative to that in the external (ambient) air. The sensor 16 may operate by monitoring the exhaust gas from the combustion chamber/cylinder 12 while the internal combustion engine 2 undergoes a LSPI combustion engine cycle/event, wherein the air-fuel mixture in the combustion chamber/cylinder 12 ignites prior to an introduction of a spark to the combustion chamber/cylinder 12 from igniter 30. From this monitoring, the sensor 16 may detect a difference in oxygen between the exhaust gas and the external (ambient) air, and generate a voltage output signal 18 representative of the difference between the two values. An output voltage may represent a lean mixture (e.g. 0.2 V (200 mV) DC); or a rich mixture (e.g. 0.8 V (800 mV) DC); or a stoichiometric mixture (e.g. 0.45 V (450 mV) DC).

The voltage signal 18 may then be used by the electronic programmable engine controller 24 (e.g. engine control unit (ECU), engine control module (ECM), or power-train control module (PCM)) as part of a closed-loop feedback system. The engine controller 24 may use its own signal 26 to adjust at least one operating parameter of the internal combustion engine in response to the output 18 of the oxygen sensor 16, wherein the at least one operating parameter is adjusted to inhibit an occurrence of a subsequent LSPI combustion event. For example, the engine controller 24 may modify the fuel injection strategy of a fuel injector 28 such as adjusting the fuel injection amount, fuel injection timing or fuel injection profile; temporary reduce the engine load by at least partially closing the throttle, at least partially reduce boost pressures of the turbo; and/or to modify combustion timing strategies such as adjusting the combustion (spark) timing of an igniter 30 with an appropriate signal 26.

For example, the engine controller 24 may adjust the ignition (spark) timing of the igniter 30 and/or the amount of fuel injected into the engine by a fuel injector 28 to compensate for excess air or excess fuel. The controller 24 may attempt to maintain, on average, a particular air-fuel ratio by interpreting the information it gains from the oxygen sensor 16. For example, by measuring the proportion of oxygen in the remaining exhaust gas, and by knowing the volume and temperature of the air entering the combustion chamber, the controller 24 can use look-up tables to determine the amount of fuel required to burn at the stoichiometric ratio (14.7:1 air to fuel by mass for gasoline) to ensure complete combustion.

In order for the oxygen sensor 16 to function over a wider range, it may be desirable for the oxygen sensor 16 to more particularly comprise a wideband oxygen sensor. For a wideband sensor, the zirconia sensor/cell may be coupled with an oxygen ion pump cell. Consequently, the sensor 16 may comprise a dual cell sensor. Exemplary wideband oxygen sensors may include NGK/NTK L1H1 & L2H2 sensors or NGK/NTK LZAA03-E1 sensor (NGK Spark Plugs, Inc.)

The oxygen sensor 16 may be particularly placed in the exhaust stream/passage 14 between the combustion chamber/cylinder 12 of the cylinder block 10 of the internal combustion engine 2 and a downstream catalytic converter 22 in such a manner that the output from the oxygen sensor provides an indicator of the LSPI combustion engine cycle/event within two revolutions of the engine after the occurrence of the LSPI combustion engine cycle/event. For example, the oxygen sensor 16 may be particularly placed as close to the combustion chamber/cylinder 12 as possible, such as adjacent to the combustion chamber/cylinder 12, to provide data from the exhaust gas to the engine controller 24 as quick as possible, so that the engine controller 24 may take action to inhibit any further LSPI combustion engine cycles/events as quick as possible. As shown in FIGS. 1 and 2, the net crank position change from peak cylinder pressure to corresponding peak equivalence ratio, Phi ($\Phi$), ranged from a low of 560 degrees (1.56 revolutions) to 870 degrees (2.42 revolutions).

As indicated above, as shown in FIG. 1 after displaying a normal high of about 1 in the equivalence ratio, Phi ($\Phi$), prior to the occurrence of the LSPI combustion event, the equivalence ratio, Phi ($\Phi$), increased to a high ranging from 1.09 (at Points F and G) to 1.24 (at Point D) after the occurrence of the LSPI combustion event. Thus, the engine controller 24 may be programmed such that, once a predetermined (programmed) threshold equivalence ratio, Phi ($\Phi$), is exceeded, the engine controller 24 may use the output to adjust at least one operating parameter of the internal combustion engine in response to the output of the oxygen sensor to inhibit an occurrence of a subsequent LSPI combustion event.

Returning to FIG. 3, as shown, the internal combustion engine 2 comprises four combustion chambers/cylinders 12 and, equally, four oxygen sensors 16, with at least one oxygen sensor 16 configured to operate with each combustion chamber/cylinder 12 of the engine 2, particularly located adjacent the exhaust port of each combustion chamber/cylinder 12 of the engine 2. The oxygen sensors are positioned such that they may each individually sample the exhaust gases from the individual cylinders 12 without cross-contamination. Accordingly, the oxygen sensors are positioned to achieve that capability, and their location from one engine to another may vary while still accomplishing such objective.

As shown, engine 2 comprises an exhaust manifold 22, with the exhaust manifold comprising a plurality of branch exhaust passages 14. As shown, the branch exhaust passages 14 are configured to separately receive exhaust gas from a different combustion chamber of the internal combustion engine 2. Furthermore, at least one oxygen sensor 16 may be located in each branch exhaust passage 14 of the exhaust manifold 22. Each oxygen sensor 16 may detect exhaust gas from the combustion chamber/cylinder 12 it is configured to operate with prior to the exhaust gas from the upstream combustion/cylinder 12 mixing with exhaust gas from another combustion chamber/cylinder 12. If an oxygen sensor 16 were to detect exhaust gas mixed from different combustion chamber/cylinder 12, it may not be plausible for the engine controller 24 to determine specifically which combustion chamber/cylinder 12 may have undergone a LSPI combustion event. After the engine controller 24 detects a presence of the LSPI event in response feedback received from at least one of the oxygen sensors 16, the engine controller 24 is configured to adjust at least one engine operating parameter of an internal combustion engine in response to the LSPI combustion event to inhibit a subsequent LSPI event.

Hence, only after the oxygen sensors 16 may detect exhaust gas in the branch exhaust passages 14 in fluid communication with the combustion chamber/cylinder 12 it is configured to operate with, may the exhaust gas from each combustion chamber/cylinder 12 and branch exhaust passages 14 then be mixed in collection passage 20 of manifold 22. As shown in FIG. 3, the exhaust gas from each combustion chamber/cylinder 12 and exhaust branch passage 14 may be mixed in an exhaust manifold 20 after being exposure to the individual oxygen sensors 16. Thereafter, the mixed exhaust gas may flow to a catalytic converter to be treated and ultimately discharged from the exhaust system.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed is:

1. A method to detect and inhibit an abnormal combustion event in an internal combustion engine, the method comprising:

introducing air and fuel into a cylinder of the internal combustion engine;

operating the internal combustion engine to produce exhaust gas from the cylinder, the engine operated at a break mean effective pressure greater than or equal to 10 bars at a speed less than or equal to 2,000 revolutions per minute;

monitoring the exhaust gas from the cylinder with an oxygen sensor while the internal combustion engine undergoes a pre-ignition combustion event, wherein the air-fuel mixture in the cylinder ignites prior to an introduction of a spark to the cylinder from an igniter;

obtaining an output from the oxygen sensor, the output from the oxygen sensor providing an indicator of the pre-ignition combustion event within two revolutions of the engine after the pre-ignition combustion event; and adjusting at least one operating parameter of the internal combustion engine in response to the output of the oxygen sensor, wherein the at least one operating parameter is adjusted to inhibit an occurrence of a subsequent pre-ignition combustion event;

wherein the output from the oxygen sensor corresponds to an air-fuel equivalence ratio following the pre-ignition combustion event; and wherein an engine controller uses the output to adjust the at least one operating parameter of the internal combustion engine in response to the output of the oxygen sensor to inhibit the occurrence of the subsequent pre-ignition combustion event.

2. The method of claim 1 wherein:
the output from the oxygen sensor corresponds to an air-fuel equivalence ratio following the pre-ignition combustion event which exceeds a threshold air-fuel equivalence ratio of the engine controller.

3. The method of claim 1 wherein:
the output from the oxygen sensor comprises a voltage.

4. The method of claim 1 wherein:
the output from the oxygen sensor is received by an engine controller.

5. The method of claim 1 wherein:
adjusting at least one operating parameter for the internal combustion engine in response to the output of the oxygen sensor is performed by an engine controller.

6. The method of claim 5 wherein:
the engine controller adjusts at least one of a fuel injection amount, fuel injection timing and fuel injection profile.

7. The method of claim 5 wherein:
the engine controller adjusts a spark timing.

8. The method of claim 5 wherein:
the internal combustion engine includes a throttle; and
the engine controller at least partially closes the throttle.

9. The method of claim 5 wherein:
the internal combustion engine includes a turbo; and
the engine controller at least partially reduces a boost pressure of the turbo.

10. The method of claim 1 wherein:
the oxygen sensor comprises a wideband oxygen sensor.

11. The method of claim 1 wherein:
the oxygen sensor comprises a dual cell oxygen sensor.

12. The method of claim 1 wherein:
the internal combustion engine comprises a plurality of cylinders; and
the oxygen sensor senses the exhaust gas from the cylinder prior to the exhaust gas mixing with exhaust gas from the other cylinders.

13. The method of claim 1 wherein:
the internal combustion engine comprises a plurality of cylinders and oxygen sensors; and
at least one oxygen sensor is configured to operate with each cylinder of the engine.

14. The method of claim 13 wherein:
each oxygen sensor senses exhaust gas from the cylinder the sensor is configured to operate with prior to the exhaust gas from each cylinder mixing with exhaust gas from the other cylinders.

15. An apparatus to detect and inhibit an abnormal combustion event in an internal combustion engine, the apparatus comprising:
an exhaust manifold, the exhaust manifold comprising a plurality of branch exhaust passages, each branch exhaust passage configured to separately receive exhaust gas from a different combustion chamber of the internal combustion engine;
at least one oxygen sensor located in at least one of the branch exhaust passages of the exhaust manifold; and
an engine controller, the engine controller configured to detect a presence of a pre-ignition event in response feedback received from the at least one oxygen sensor within two revolutions of the engine after the pre-ignition combustion event and while the engine is operated at a break mean effective pressure greater than or equal to 10 bars at a speed less than or equal to 2,000 revolutions per minute, and adjust at least one engine operating parameter of an internal combustion engine in response to the pre-ignition combustion event to inhibit an occurrence of a subsequent pre-ignition combustion event; and
wherein an output from the oxygen sensor corresponds to an air-fuel equivalence ratio following the pre-ignition combustion event.

* * * * *